May 8, 1951     J. H. MARCUM     2,552,336
TWO-WAY VALVE
Filed May 5, 1948
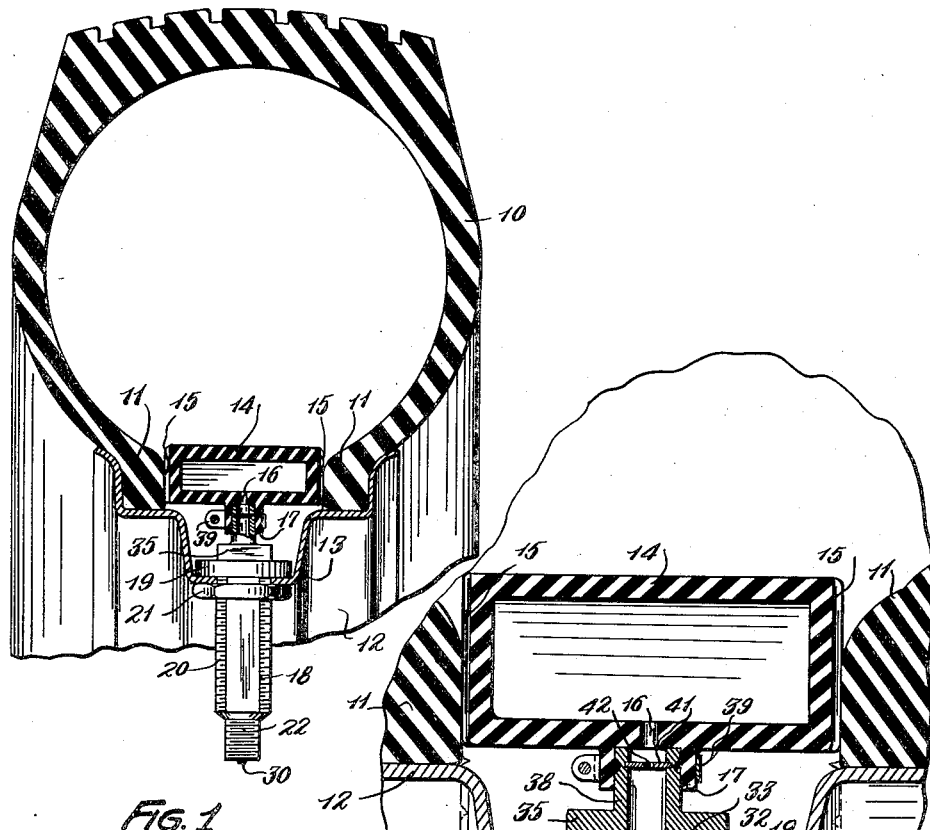
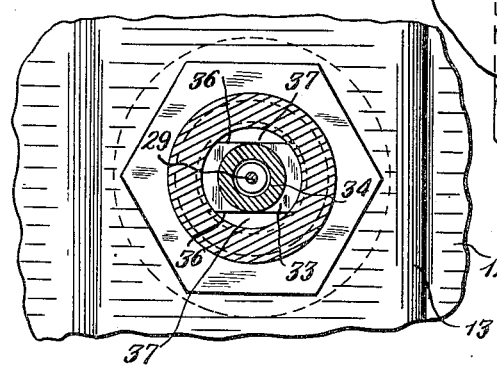
FIG. 1
FIG. 3
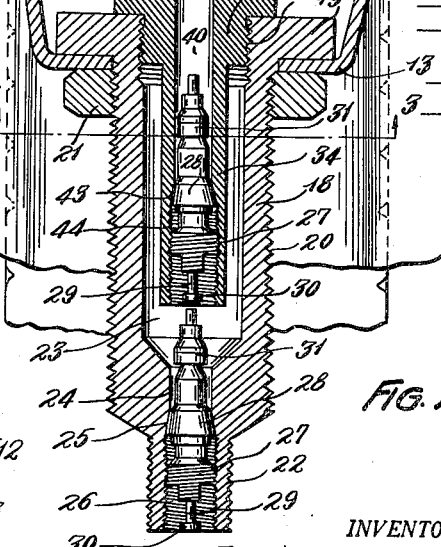
FIG. 2
INVENTOR.
JAMES H. MARCUM
BY
Kwis, Hudson, Boughton & Williams
ATTORNEYS Patented May 8, 1951

2,552,336

UNITED STATES PATENT OFFICE 2,552,336

TWO-WAY VALVE

James H. Marcum, Cleveland Heights, Ohio, assignor to The Dill Manufacturing Company, Cleveland, Ohio, a corporation of Ohio Application May 5, 1948, Serial No. 25,161

1 Claim. (Cl. 152—400)

This invention relates to a valve housing and valve and particularly to a two way valve housing and valve wherein dual passages are provided through the valve housing.

While the valve housing and valve embodying the invention may be advantageously employed in various environments it will be described herein as used in combination with that type of pneumatic tire which utilizes only a tire casing as distinguished from that type of tire employing a tire casing and an inner tube.

In pneumatic tires of the type employing a tire casing only, difficulty has been experienced in causing the beads of the casing to adequately engage the tire rim to retain the tire casing in position on the rim. Various expedients have been employed in this type of pneumatic tire to effect the proper engagement of the casing beads with the tire rim. One of the forms or arrangements for effecting this engagement is the use of an inflatable annulus or ring that is located intermediate the beads of the casing and which when inflated presses the beads of the casing into tight holding engagement with the tire rim. In view of the fact that in the arrangement just referred to it is necessary to inflate both the tire casing and the inflatable annulus or ring, the usual form of valve housing and valve is not readily adapted for this situation and considerable difficulty has been experienced in finding a suitable valve housing so constructed as to effect the proper inflation of the casing and the inflatable ring or annulus.

An object of the present invention is to provide a valve housing and valve capable of use in the environment referred to and such that the casing and the inflatable ring or annulus can be properly inflated in one inflating operation, it being understood that the casing requires considerably greater inflating pressures than does the ring or annulus to be properly inflated.

Another object of the invention is to provide a valve housing and valve as referred to in the last named object and which is simple in construction, can be readily manufactured, easily installed, and which adequately and effectively performs its designed purpose.

Further and additional objects and advantages not hereinbefore referred to will become apparent hereinafter during the detailed description of an embodiment of the invention which is to follow.

Referring to the accompanying drawings illustrating such embodiment of the invention, Fig. 1 is a transverse sectional view through a pneumatic tire employing only a tire casing, through the inflatable ring or annulus used therewith, and through the tire rim, the valve housing and valve being shown mostly in elevation with only a small portion thereof broken away and shown in section.

Fig. 2 is a view, on a larger scale than Fig. 1, showing fragmentary portions of the tire casing and inflatable ring or annulus in section, the tire rim in section and the valve housing and valve in longitudinal section, and Fig. 3 is a transverse sectional view taken substantially on line 3—3 of Fig. 2 looking in the direction of the arrows.

The pneumatic tire shown herein is of that type which employs a tire casing only as distinguished from that type of pneumatic tire employing both a tire casing and an inner tube. The tire casing is indicated at 10 and is provided with circular beads 11 which fit into the retaining flanges of the tire rim 12 and act to hold the casing on the rim. The tire rim 12 is provided with a drop center portion 13. As already stated, difficulty has been experienced in retaining this type of pneumatic tire on the rim since the beads 11 in some installations do not engage the flanges of the tire rim with sufficient pressure to retain the tire casing properly in position on the rim. In order to overcome this difficulty recourse has been had to the use of an inflatable ring or annulus arranged intermediate the beads 11 of the casing and which when inflated presses said beads into firm engagement with the flanges of the tire rim.

A ring or annulus of the type referred to is shown at 14 and it will be apparent that a problem exists in properly inflating the casing simultaneously with the proper inflation of the ring or annulus so as to avoid either an under inflation of the casing or an over inflation of the ring. In addition, this construction presents a definite problem in the matter of the valve housing and valve which can be used therewith to effect in a single inflating operation the proper inflation of the casing and the ring. The valve housing and valve embodying the invention and now to be described adequately solves these problems and insures the correct inflation of the casing and ring in a single inflating operation.

Before describing the valve housing and valve in detail it should be pointed out that the inflatable ring or annulus on opposite sides thereof is provided with series of circumferentially spaced grooves 15 which when the ring or annulus is expanded the beads 11 of the casing form therewith passages placing the interior of the casing in communication with the circular drop center chamber portion 13 of the rim. The inflatable ring or annulus 14 is provided with a single opening 16 coaxial with an integral nipple or cylindrical lip 17.

The valve housing and valve comprises an exterior tubular housing 18 which is provided with an annular flange or head 19 at one end of the housing and which flange or head is adapted to be located within the drop center 13 of the rim and to engage the inner side thereof while the housing projects radially inwardly of the rim through an opening formed in the drop center portion 13 and aligned with the nipple 17 of the ring 14.

The outer housing 18 is exteriorly threaded as indicated at 20 so that a retaining or clamping nut 21 can be screwed onto the outer housing to firmly clamp the drop center 13 of the rim between it and the flange or head 19 and thus retain the outer housing in centered position with respect to the rim opening, it being understood that suitable gaskets may be employed between the rim and the head 19 and nut 21. The other or inner end of the outer housing 18 is reduced to provide an exteriorly threaded nipple 22 on which a valve cap may be screwed.

The outer housing 18 is provided with an enlarged counterbore 23 that extends from the end of the outer housing on which the flange or head 19 is arranged longitudinally of the housing to adjacent the other end thereof where it communicates with a circular bore 24 that, in turn, communicates with a tapered or conical bore 25. The tapered or conical bore 25 communicates with a cylindrical threaded bore 26 formed in the nipple 22. The threaded bore 26, the tapered bore 25 and the cylindrical bore 24 correspond to the usual internal configuration of the conventional valve housing for the purpose of enabling a conventional valve core or insides to be mounted and retained therein.

Fig. 2 illustrates such a conventional valve core or valve insides thus mounted, it being noted that the threaded swivel plug 27 thereof screws into the threaded bore 26 while the tapered gasketed portion 28 of the core or insides barrel sealingly engages the conical bore 25 with the remainder of the barrel extending through the cylindrical bore 24 and having a valve seat at the end thereof located within the enlarged counterbore 23. The conventional valve core or insides, as is well understood in the art, is provided with a valve pin 29 carrying at one end a head 30 and at its opposite end a valve 31, the head 30 being in a position to be engaged by the pin of the usual air chuck when applied to the nipple 22 to cause endwise movement of the pin to unseat the valve 31, it being understood that said valve normally maintained seated by means of a coil spring located within the barrel. Inasmuch as the construction of the valve core or insides is well known to those skilled in the art further description thereof is unnecessary, it being felt that its purpose is adequately illustrated in Fig. 2.

The counterbore 23 adjacent the head or flange 19 is threaded as indicated at 32 for the purpose of enabling an exteriorly threaded portion 33 of an inner valve housing 34 to be screwed into the counterbore until an integral flange or head 35 firmly engages the flange or head 19 of the outer valve housing 18, which flange or head 35 is provided with diametral flats. The exteriorly threaded portion 33 of the inner valve housing 34 is provided on its diametrically opposite sides with flats 36, see Fig. 3, correlated to the flats on the flange or head 35, wherefore relatively large capacity air passageways 37 are provided between the portion 33 and the outer valve housing. Thus it will be seen that the counterbore 23 in the outer housing 18 is in communication with the circular chamber or space between the drop center 13 of the rim and the inflatable ring 14 and due to the circular series of passages 15 with the interior of the tire casing.

The inner housing 34 beyond the head 35 is provided with a cylindrical extension 38 that is adapted to interfit the nipple 17 of the inflatable ring and to be secured therein either by a clamping ring 39 or by being vulcanized to the inflatable ring 14 and its nipple 17. The inner housing 34 is provided with a bore 40 that communicates with the opening 16 in the inflatable ring 14. A disk 41 is secured in the bore 40 adjacent to the opening 16 and said disk is provided with a central opening 42 of predetermined size which functions to reduce or regulate the volume of pressure fluid which can flow through the bore 40, the opening 16 and into the inflatable ring 14. The bore 40 communicates with a tapered or conical counterbore 43 and the latter in turn with a threaded cylindrical counterbore 44. A conventional valve core or insides is mounted in the counterbores 44 and 43 and the bore 40 and since said core or insides is identical in construction and in the manner in which it is mounted in the inner housing 34 with the valve core or insides that is mounted in the outer housing 18 the same reference characters have been applied thereto and further description appears unnnecessary.

It will be noted that the extended portion of the valve pin 29 beyond the valve 31 of the core or insides mounted in the outer housing 18 is so located that when the valve 31 thereof is unseated said extended portion will engage the head 30 of the valve pin of the core or insides mounted in the inner housing 34 and depress said pin to open or unseat the valve 31 of this latter core or insides.

In assembling the casing and the inflatable ring on the tire rim the following procedure may be followed. It being assumed that the inner housing 34 is secured to the nipple 17 of the inflatable ring 14 and that said inner housing is screwed into the outer housing 18, the latter is passed through the opening in the drop center portion 13 of the rim and the inflatable ring is located above said drop center portion. Then the tire casing may be mounted on the rim with the beads 11 thereof located intermediate the inflatable ring 14 and the flanges of the tire rim. When this has been done the nut 21 can be screwed upon the outer housing 18 to firmly clamp the valve stem and valve assembly in position.

It will further be assumed that the valve core has been mounted in the inner housing 34 and another valve core has been positioned in the outer housing 18 as indicated in Fig. 2. Now when it is desired to inflate the casing and the inflatable ring or annulus 14 the air chuck of an air line is applied to the nipple 22 of the outer housing 18. The pin of this air chuck depresses the valve pin of the insides or core carried by the outer housing to unseat the valve thereof. The depression of this valve pin acts to depress the valve pin of the core or insides carried by the inner housing 34 and thus to unseat the valve of this latter core or insides. Consequently pressure fluid will flow through the valve core carried by the outer housing 18 and into the counterbore 23. The greater portion of this pressure fluid in the counterbore 23 will follow the easiest path and hence will flow through the large capacity passages 37 and into the annular chamber or space between the inflatable ring 14 and the drop center 13 of the rim, from whence it flows through the series of circularly spaced passages 15 into the tire casing 10 to effect rather rapid inflation of the casing. At the same time a minor portion of the pressure fluid will flow through the valve core that is mounted in the inner housing 34 and through the bore 40 of the inner housing, the restricted opening 42 of the disk 41 and thence through the single opening 16 into the inflatable ring or annulus 14 to effect a relatively slow inflation of the ring or annulus.

Because of the difference in volume of the pressure fluid entering the tire casing and that entering the inflatable ring or annulus the tire casing will be quickly inflated and concurrently therewith the inflatable ring or annulus will be properly inflated and will function to press the beads 11 of the casing outwardly into firm engagement with the flanges of the tire rim. Thus the casing will be held securely on the rim and it will be noted that a single inflating operation effects the proper inflation of the casing 10 and ring or annulus 14 by the application of the air line chuck to the nipple 22 of the outer housing 18.

Although a preferred embodiment of the invention has been illustrated and described herein it will be understood that such embodiment is susceptible of various modifications and adaptations within the scope of the appended claim.

Having thus described my invention, I claim:

In combination, a tire rim having a drop center and circumferential flanges, a tire casing mounted on said rim and having circular beads contacting said flanges, an inflatable ring or annulus located between the beads of said casing and overlying said drop center of the rim in spaced relation thereto, and means providing a plurality of passages between said ring and said beads and placing the space between said ring and said drop center freely in communication with the interior of said casing; an inner valve housing attached to said ring and provided with a passage therethrough in restricted communication with the interior of said ring, an outer valve housing connected to said inner valve housing and provided with a counterbore into which said inner valve housing extends in concentric spaced relationship, said outer housing projecting through an opening in the drop center of the rim and being provided with a head located interiorly of the rim, means for clamping the outer housing in position in the rim opening, said outer and inner housings having cooperating portions forming passages placing said counterbore freely in communication with the space between said drop center of said rim and said inflatable ring, said inner and outer housings being provided with bore portions having mounted therein valve cores or insides having movable valve pins and arranged with the inner end of the valve pin of the outer housing core or insides aligned with and closely adjacent to the outer end of the valve pin of the inner housing core or insides, wherefore opening of the core or insides of the outer housing opens the core or insides of the inner housing and allows pressure fluid to flow into said counterbore of the outer housing and into the passage of the inner housing from which the pressure fluid flows freely to the interior of said casing and restrictedly to the interior of said ring.

JAMES H. MARCUM.

REFERENCES CITED

The following references are of record in the file of this patent:

UNITED STATES PATENTS

| Number | Name | Date |
| --- | --- | --- |
| 1,494,137 | Schweinert | May 13, 1924 |
| 1,653,054 | Mack | Dec. 20, 1927 |
| 1,889,799 | Clark | Dec. 6, 1932 |
| 2,122,740 | Eckenroth | July 5, 1938 |
| 2,189,485 | Crowley | Feb. 6, 1940 |

FOREIGN PATENTS

| Number | Country | Date |
| --- | --- | --- |
| 118,297 | Australia | 1944 |